United States Patent
Ioppolo et al.

(10) Patent No.: US 10,882,421 B2
(45) Date of Patent: Jan. 5, 2021

(54) ASSEMBLY GROUP OF A VEHICLE SEAT COMPRISING

(71) Applicant: BROSE FAHRZEUGTEILE GMBH & CO. KOMMANDITGESELLSCHAFT, COBURG, Coburg (DE)

(72) Inventors: Leo Ioppolo, Washington Township, MI (US); Sean Sabo, West Bloomfield, MI (US)

(73) Assignee: BROSE FAHRZEUGTEILE GMBH & CO. KOMMANDITGESELLSCHAFT, COBURG, Coburg (DE)

(*) Notice: Subject to any disclaimer, the term of this patent is extended or adjusted under 35 U.S.C. 154(b) by 0 days.

(21) Appl. No.: 16/183,677

(22) Filed: Nov. 7, 2018

(65) Prior Publication Data

US 2020/0139856 A1 May 7, 2020

(51) Int. Cl.
| | |
|---|---|
| *F16M 13/00* | (2006.01) |
| *B60N 2/16* | (2006.01) |
| *B60N 2/68* | (2006.01) |
| *A47C 3/20* | (2006.01) |

(52) U.S. Cl.
CPC ............. *B60N 2/1615* (2013.01); *A47C 3/20* (2013.01); *B60N 2/682* (2013.01)

(58) Field of Classification Search
CPC .......... B60N 2/07; B60N 2/04; B60N 2/1615; B60N 2/0722
See application file for complete search history.

(56) References Cited

U.S. PATENT DOCUMENTS

| | | | |
|---|---|---|---|
| 2012/0128411 A1 | 5/2012 | Kneif et al. | |
| 2013/0193296 A1* | 8/2013 | Hoshi | B60N 2/0722 248/429 |
| 2013/0292539 A1 | 11/2013 | Speck et al. | |
| 2014/0209775 A1* | 7/2014 | Beier | B60N 2/08 248/429 |

FOREIGN PATENT DOCUMENTS

| | | |
|---|---|---|
| DE | 10 2010 042 008 A1 | 4/2012 |
| DE | 10 2010 042 285 A1 | 4/2012 |
| DE | 10 2010 051 955 A1 | 5/2012 |

* cited by examiner

*Primary Examiner* — Amy J. Sterling
(74) *Attorney, Agent, or Firm* — Lewis Roca Rothgerber Christie LLP (57) ABSTRACT

An assembly group of a vehicle seat, comprises a lower guide rail attachable to a vehicle floor and an upper guide rail coupled to the lower guide rail and movable with respect to the lower guide rail along a longitudinal axis, the upper guide rail comprising a top wall and a pair of side walls connected by the top wall. A link arm is pivotably connectable to the upper guide rail for coupling a frame assembly to the upper guide rail. A first fastener for pivotably coupling the link arm to the upper guide rail is disposed between the pair of side walls and being at least partially positioned below a top surface of the top wall.

12 Claims, 9 Drawing Sheets

ASSEMBLY GROUP OF A VEHICLE SEAT COMPRISING

TECHNICAL FIELD

The instant invention relates to an assembly group of a vehicle seat. The instant invention in particular relates to an assembly group of a vehicle seat comprising a lower guide rail attachable to a vehicle floor and an upper guide rail coupled to the lower guide rail and movable with respect to the lower guide rail along a longitudinal axis, the upper guide rail and the lower guide rail being part of a length adjustment device for adjusting a length position of the vehicle seat with respect to a vehicle floor.

BACKGROUND

For a vehicle seat, in particular a front seat in a vehicle, it is desirable to be able to adjust the height of a seat part in order to allow adapting the vehicle seat for providing a comfortable seating for a passenger. For this, typically one or multiple link arms are pivotably connected to an upper guide rail on either side of a vehicle seat, such that, by pivoting the one or the multiple link arms, a frame assembly connected to the upper guide rail by means of the one or the multiple link arms is adjusted in its height position with respect to the upper guide rail.

Herein, the lowest position of the frame assembly with respect to the upper guide rail, the so-called "low block height", is generally defined by the connection of the one or the multiple link arms to the upper guide rail. The connection of a link arm to the upper guide rail in particular defines a pivot axis about which the link arm is pivotable with respect to the upper guide rail, the position of the pivot axis with respect to the upper guide rail constraining the ability to lower the low block height of the vehicle seat.

Different arrangements of a fastener element on an upper guide rail are known for example from DE 10 2010 042 008 A1, DE 10 2010 042 285 A1, and DE 10 2010 051 955 A1.

SUMMARY OF THE INVENTION

It is an object to provide an assembly group of a vehicle seat which allows to lower the low block height, the low block height defining the lowest position to which a frame assembly of a vehicle seat can be approached towards the upper guide rail by pivoting a link arm with respect to the upper guide rail.

In one aspect, an assembly group of a vehicle seat is provided, the assembly group comprising: a lower guide rail attachable to a vehicle floor; an upper guide rail coupled to the lower guide rail and movable with respect to the lower guide rail along a longitudinal axis, the upper guide rail comprising a top wall and a pair of side walls connected by the top wall; a link arm pivotably connectable to the upper guide rail for coupling a frame assembly to the upper guide rail; and a first fastener for pivotably coupling the link arm to the upper guide rail, the first fastener being disposed between the pair of side walls and being at least partially positioned below a top surface of the top wall.

According to one aspect, the first fastener serves to pivotably couple the link arm to the upper guide rail. The first fastener herein is disposed between the pair of side walls and extends from one side wall to another, the first fastener being at least partially positioned beneath a top surface of the top wall, the top surface being located at an upper side of the top wall opposite the side walls extending from the top wall towards the lower guide rail. Because the first fastener at least partially is positioned below the top surface of the top wall, the position of the pivot axis provided by the first fastener can be lowered with respect to the top wall of the upper guide rail, hence reducing constraints on lowering the lower block height.

In one embodiment, a second fastener is connectable to the first fastener for pivotably coupling the link arm to the upper guide rail. The first fastener herein may have the shape of a threaded sleeve comprising a threaded opening for receiving the second fastener, which in this case is shaped as a threaded stud comprising a threaded shaft. In another embodiment, the first fastener is shaped as a threaded stud comprising a threaded shaft, a second fastener in the shape of a threaded sleeve being screw-connectable to the first fastener.

The first fastener and the second fastener together serve to provide a bearing for the link arm to pivotably connect the link arm to the upper guide rail. For this, one of the first fastener and the second fastener may comprise a bearing section on which the link arm may be received such that the link arm is pivotable with respect to the first fastener and the second fastener. By pivoting the link arm with respect to the upper guide rail the height position of the frame assembly with respect to the upper guide rail can be adjusted such that the frame assembly can for example be approached towards the upper guide rail in order to lower a seat height of the vehicle seat.

In another aspect, the upper guide rail comprises an aperture for receiving the first fastener.

In one embodiment, the aperture may be formed in the top wall such that it reaches into both side walls, the aperture providing for a recess in the shape of a notch (cutout) in which the first fastener may be disposed such that the first fastener at least partially reaches into the recess and hence is at least partially positioned below the top surface of the top wall.

In another embodiment, each side wall of the pair of side walls comprises a bore, the bores of the side walls together forming an aperture for receiving the first fastener. The bores of the side walls in particular may be aligned with respect to each other along a transverse direction pointing transverse to the longitudinal axis such that the first fastener may be inserted into the bores to extend in between the side walls of the upper guide rail.

In one aspect, the first fastener, for example in the shape of a threaded sleeve or a threaded stud, extends along a direction transverse to the longitudinal axis from a first side wall of the pair of side walls to a second side wall of the pair of side walls. The first fastener hence extends transversely across the upper guide rail from one side wall to the other side wall, thus allowing for a strong connection of the fast first fastener to the upper guide rail.

In one embodiment, the first fastener is connected to the upper guide rail by means of a weld joint. The first fastener hence may be directly connected to the upper guide rail, for example to the top wall of the upper guide rail or to one or both of the side walls of the upper guide rail, by welding, for example by laser welding or by MIG or MAG welding. For example, if an aperture is formed in the top wall of the upper guide rail, the first fastener may be connected by welding to edges of the aperture formed in the top wall. If the aperture is formed by bores in the side walls, the first fastener may be connected to the side walls by weld joints extending about each bore.

In another embodiment, an attachment bracket may be provided serving to connect the first fastener to the upper guide rail. Herein, the attachment bracket may for example be connected to the top wall of the upper guide rail, wherein the first fastener is connected to the attachment bracket by means of a weld joint, for example by laser welding or by MIG or MAG welding. In this embodiment, the first fastener is for example not connected directly to the upper guide rail, but is connected to the attachment bracket and via the attachment bracket to the upper guide rail. A weld joint hence is formed in between the first fastener and the attachment bracket, but not in between the first fastener and the upper guide rail, allowing for example to pre-assemble and deliver a sub assembly comprising an attachment bracket and a first fastener connected to the attachment bracket.

In one embodiment, the attachment bracket is connected to the upper guide rail, in particular the top wall of the upper guide rail, by welding. The attachment bracket herein may be formed such that it bridges, when it is connected to the top wall of the upper guide rail, an aperture formed in the top wall for receiving the first fastener, the attachment bracket hence reaching over the aperture along the longitudinal axis and hence increasing the strength of the upper guide rail in the neighborhood of the aperture formed in the top wall.

In one embodiment, the attachment bracket comprises a middle section and at least one flange section, wherein the middle section confines a reception opening for receiving the first fastener. The middle section may have a generally rectangular (C) shape or a rounded shape and serves to receive the first fastener therein. The first fastener herein may be connected to the middle portion by means of welding, for example by laser welding or MIG or MAG welding.

The at least one flange section may for example be flatly placed on the top wall of the upper guide rail. The at least one flange section may for example be connected to the top wall by welding, for example laser welding or MIG or MAG welding. The at least one flange section forms a lap joint with the top wall, wherein one or multiple projections may be provided on the at least one flange section for engaging with an associated, complementary opening in the top wall for establishing a particularly strong welded connection in between the attachment bracket and the top wall of the upper guide rail.

In one embodiment, the attachment bracket comprises two flange sections, one flange section being placed at each side of the middle portion. Each flange section flatly abuts the top wall of the upper guide rail, wherein the attachment bracket is connected to the upper guide rail by welding each flange section to the top wall.

In another aspect, in a preassembly state in which the first fastener is separate from the attachment bracket, the first fastener may be receivable within the reception opening confined by the middle portion of the attachment bracket at different height positions when viewed along a vertical direction perpendicular to the top wall of the upper guide rail. Prior to fixedly connecting the first fastener to the attachment bracket the first fastener may be brought into a suitable position with respect to the attachment bracket, the first fastener in particular being placeable on the attachment bracket such that the first fastener may assume different height positions with respect to the middle portion of the attachment bracket. This allows to adjust the height position of the first fastener with respect to the attachment bracket and hence with respect to the top wall of the upper guide rail, such that a lower block height may be adapted as desired by suitably placing the first fastener on the attachment bracket and connecting the first fastener to the attachment bracket.

According to one aspect, a sub-assembly comprises: a first fastener for pivotably coupling a link arm to an upper guide rail of a vehicle seat, the first fastener being configured to be disposed between a pair of side walls of the upper guide rail and to be at least partially positioned below a top surface of a top wall of the upper guide rail; and an attachment bracket configured to be connected to the top wall of the upper guide rail, wherein the first fastener is connected to the attachment bracket by means of a weld joint.

A sub-assembly of this kind may be manufactured and delivered to a customer in a state in which it is not connected to the upper guide rail. The sub-assembly is configured to be placed on an upper guide rail such that the first fastener is for example received in an aperture formed in the top wall of the upper guide rail and hence is positioned at least partially below the top surface of the top wall of the upper guide rail.

In one embodiment, said attachment bracket of the sub-assembly comprises a middle section and at least one flange section, wherein the middle section confines a reception opening for receiving the first fastener. The middle section may have a generally rectangular (C) shape or rounded shape and serves to receive the first fastener therein. The first fastener herein may be connected to the middle portion by means of welding, for example by laser welding or MIG or MAG welding.

The at least one flange section may for example be flatly placed on the top wall of the upper guide rail. The at least one flange section may for example be connected to the top wall by welding, for example laser welding or MIG or MAG welding. The at least one flange section forms a lap joint with the top wall, wherein one or multiple projections may be provided on the at least one flange section for engaging with an associated, complementary opening in the top wall for establishing a particularly strong welded connection in between the attachment bracket and the top wall of the upper guide rail.

In one embodiment, the attachment bracket comprises two flange sections, one flange section being placed at each side of the middle portion. Each flange section flatly abuts the top wall of the upper guide rail, wherein the attachment bracket is connected to the upper guide rail by welding each flange section to the top wall.

In one embodiment, in a preassembly state of the sub-assembly in which the first fastener is separate from the attachment bracket, the first fastener may be receivable within the reception opening confined by the middle portion of the attachment bracket at different height positions when viewed along a vertical direction perpendicular to the top wall of the upper guide rail. Prior to fixedly connecting the first fastener to the attachment bracket the first fastener may be brought into a suitable position with respect to the attachment bracket, the first fastener in particular being placeable on the attachment bracket such that the first fastener may assume different height positions with respect to the middle portion of the attachment bracket.

BRIEF DESCRIPTION OF THE DRAWINGS

The various features and advantages of the present invention may be more readily understood with reference to the following detailed description and the embodiments shown in the drawings. Herein.

DETAILED DESCRIPTION

Subsequently, embodiments of the invention shall be described in detail with reference to the drawings. In the drawings, like reference numerals designate like structural elements.

It is to be noted that the embodiments are not limiting for the invention, but merely represent illustrative examples.

Figure 1:
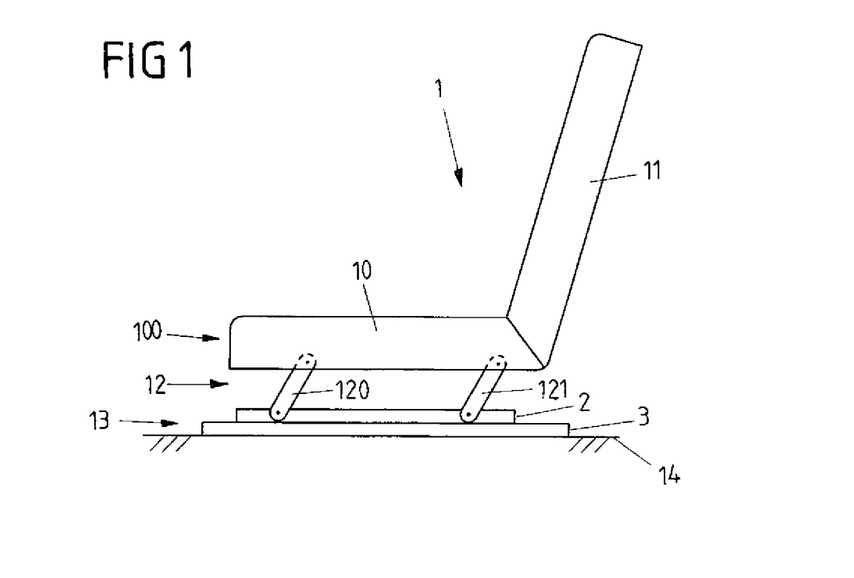
FIG. 1 shows a vehicle seat.

FIG. 1 shows, in a schematic view, a vehicle seat 1 which comprises a seat part 10 and a backrest part 11 which is connected to the seat part 10 and is generally adaptable in its inclination with respect to the seat part 10.

The seat part 10 comprises a frame assembly 100 which, by means of link arms 120, 121 of an height adjustment mechanism 12, is connected to an upper guide rail 2 coupled to a lower guide rail 3 and forming a part of a length adjustment mechanism 13. Via the length adjustment mechanism 13 the vehicle seat 1 is arranged on a vehicle floor 14.

A vehicle seat 1 generally comprises two pairs of link arms 120, 121 and two pairs of guide rails 2, 3, one on each side of the vehicle seat 1.

The link arms 120, 121 can be pivoted with respect to both the frame assembly 100 of the seat part 10 and the associated upper guide rail 2 in order to adjust the height position of the seat part of 10 with respect to the vehicle floor 14. In this way, the seat part 10 in particular can be lowered to assume a lower height position, and can be raised in order to assume an elevated height position, such that the height of the seat part 10 can be adjusted according to user preferences.

The lowest position of the seat part 10 with respect to the upper guide rail 2 generally is constrained by the connection of the link arms 120, 121 to the upper guide rail 2, the height of the seat part 10 at its lowest position being referred to as "low block height". There in this respect is a general desire to reduce constraints and to be able to lower the low block height.

Figure 2:
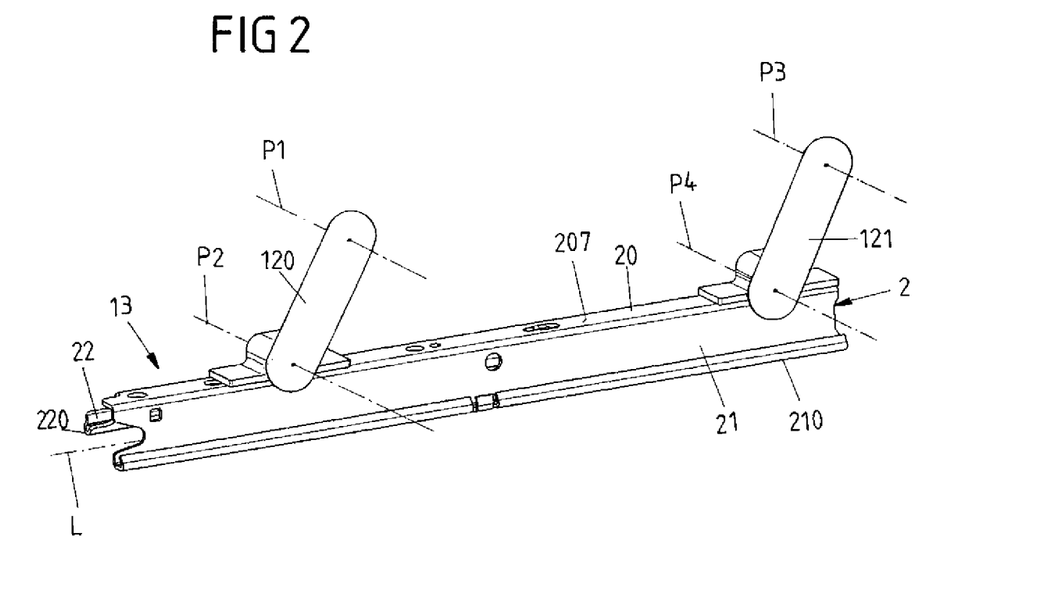
FIG. 2 shows an embodiment of an upper guide rail and two link arms pivotably connected to the upper guide rail.

Referring now to FIG. 2, link arms 120, 121 are pivotably connected to an upper guide rail 2 such that the link arms 120, 121 can pivot with respect to the upper guide rail 2 about pivot axes P2, P4. At pivot axes P1, P3 the link arms 120, 121 are connected to the frame assembly 100 of the associated seat part 10, such that by pivoting the link arms 120, 121 with respect to the upper guide rail 2 the height position of the seat part 10 with respect to the upper guide rail 2 can be adjusted.

As visible from FIG. 2, the upper guide rail 2 comprises a top wall 20 and side walls 21, 22 which are connected by the top wall 20 and together with the top wall 20 form a generally U-shaped rail. The upper guide rail 2 is coupled to an associated lower guide rail 3 (as schematically shown in FIG. 1) and is slidably guided, along a longitudinal axis L, on the lower guide rail 3 in that lower edges 210, 220 of the side walls 21, 22 engage with the lower guide rail 3 and are slidably mounted within the lower guide rail 3 for example via ball bearings or the like.

Figure 3:
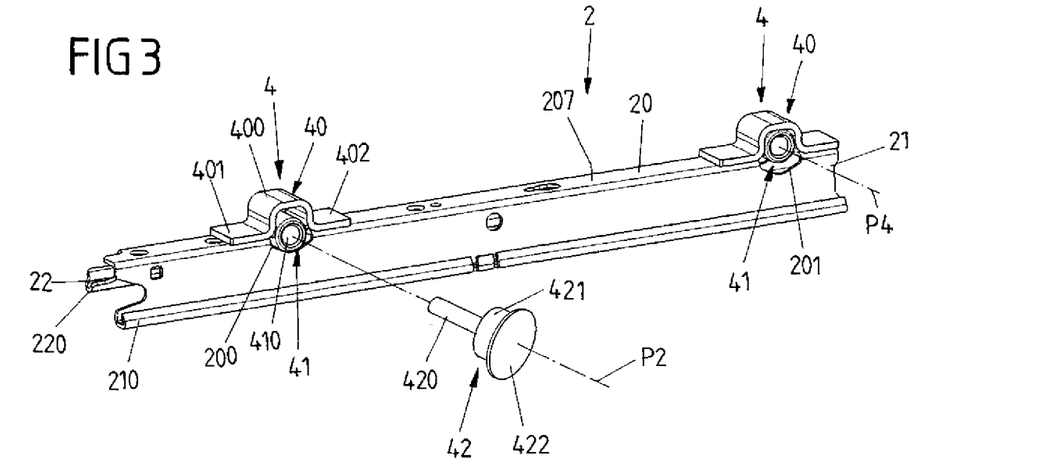
FIG. 3 shows an embodiment of an upper guide rail with fastener elements connected to the upper guide rail by means of an attachment bracket.
Figure 4:
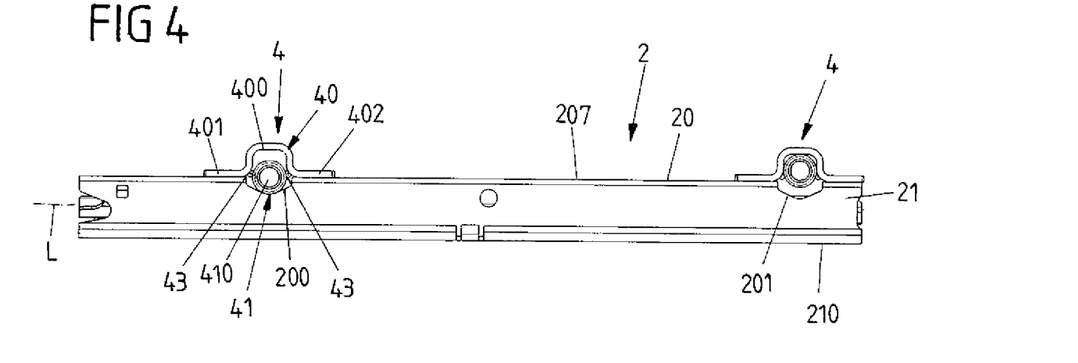
FIG. 4 shows a side view of the embodiment of FIG. 3.
Figure 5:
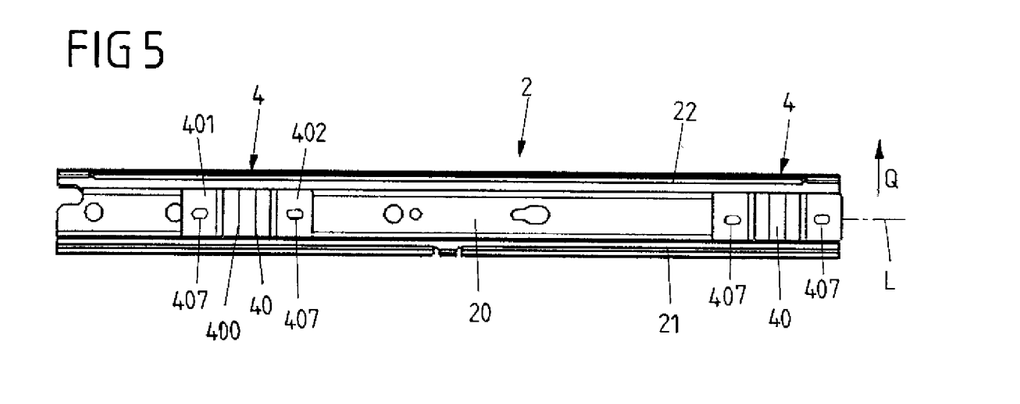
FIG. 5 shows a top view of the embodiment of FIG. 3.

Referring now to FIGS. 3 to 5, in an embodiment of an upper guide rail 2 fastener elements 41 of sub-assemblies 4 are mounted on the upper guide rail 2 in order to provide for a coupling of the link arms 120, 121 to the upper guide rail 2. Each sub-assembly 4 comprises an attachment bracket 40 having a middle section 400 and flange sections 401, 402 laterally extending from the middle section 400 and flatly abutting the top wall 20 of the upper guide rail 2. Within the middle section 400, a fastener element 41 in the shape of a threaded sleeve is received, the fastener element 41 being fastened to the middle section 400 by means of weld joints 43 on both sides of the fastener element 41, as this is visible from FIG. 4.

The weld joints 43 may for example be formed using laser welding or MIG or MAG welding.

Each fastener 41 hence is fixedly connected to an associated attachment bracket 40 of a sub-assembly 4. The attachment bracket 40 in turn is connected to the top wall 20 of the upper guide rail 2 via the flange sections 401, 402, for example by forming a weld connection in between the flange sections 401, 402 and the top wall 20 of the upper guide rail 2 using laser welding or MIG or MAG welding.

The flange sections 401, 402 may flatly abut the top wall 20 at a top face 207 facing outwards such that the flange sections 401, 402 form a weld joint with the top wall 20. A weld joint in between the flange sections 401, 402 may be formed directly in between the flange sections 401, 402 and the top wall 20, wherein in addition projections 407, as schematically illustrated in FIG. 5, may be formed on the flange sections 401, 402 to engage with corresponding openings in the top wall 20 of the upper guide rail 2 (or vice versa) to form weld joints on such projections 407.

Figure 7:
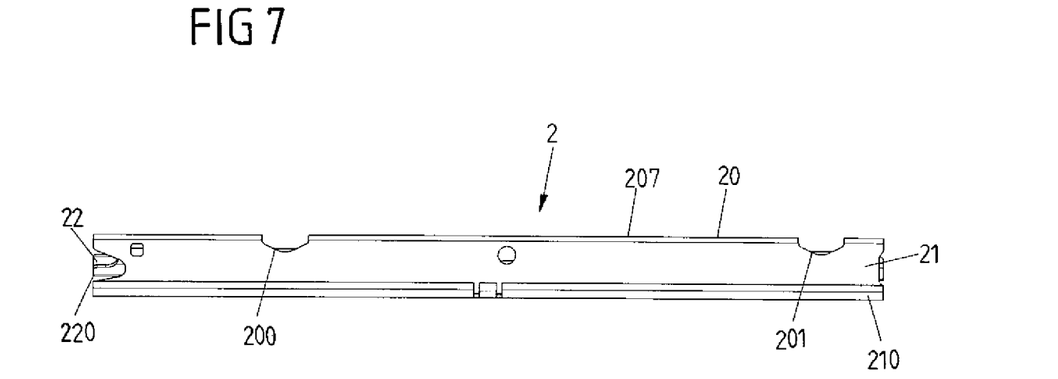
FIG. 7 shows a side view of an upper guide rail.

As visible from FIG. 3, FIG. 4 and in addition from FIG. 7, the upper guide rail 2 comprises apertures 200, 201 formed at axially displaced locations on the top wall 20, the apertures 200, 201 extending into both side walls 21, 22. By means of the apertures 200, 201 recesses are formed on the upper guide rail 2, which are configured to receive the fastener 41 of an associated sub-assembly 4, as visible from FIGS. 3 and 4.

By providing the apertures 200, 201 on the upper guide rail 2, the fasteners 41 of the sub-assemblies 4 may be received and positioned on the upper guide rail 2 such that the fasteners 41 partially are disposed beneath the top face 207 of the top wall 20, as it in particular is visible from FIG. 4. As the fasteners 41 define the pivot axes P2, P4 for coupling the link arms 120, 121 to the upper guide rail 2, in this way the height position of the pivot axes P2, P4 can be lowered with respect to the top face 207 of the top wall 20, such that a coupling in between the link arms 120, 121 and the upper guide rail 2 may be established at a lower height position. This allows to reduce constraints on the low block height and potentially allows to define a lower limit for the low block height.

Each fastener 41 extends transversely to the longitudinal axis L along a transverse direction Q and herein extends in between the two side walls 21, 22 such that it fully extends from one side wall 21 to the other side wall 22.

As visible from FIGS. 3 and 4, the attachment bracket 40 of each sub-assembly 4 extends across the associated aperture 200, 201 formed on the upper guide rail 2, the attachment bracket 40 hence bridging the associated aperture 220, 201 and hence increasing the strength of the upper guide rail 2 in the vicinity of the associated aperture 200, 201.

In the embodiment of FIGS. 3 to 5 each fastener 41 is formed as a threaded sleeved, the fastener 41 comprising a threaded opening 410 into which another, second fastener 42 formed as a threaded stud may be screwed. The fastener 42 in particular comprises a threaded shaft 420 which may be screwed into the threaded opening 410 of the fastener 41. The fastener 42 furthermore comprises a cylindrical bearing section 421 axially confined by a head section 422, the bearing section 421 being configured to receive a link arm 120, 121 for pivotably mounting the link arm 120, 121 on the upper guide rail 2.

Figure 6:
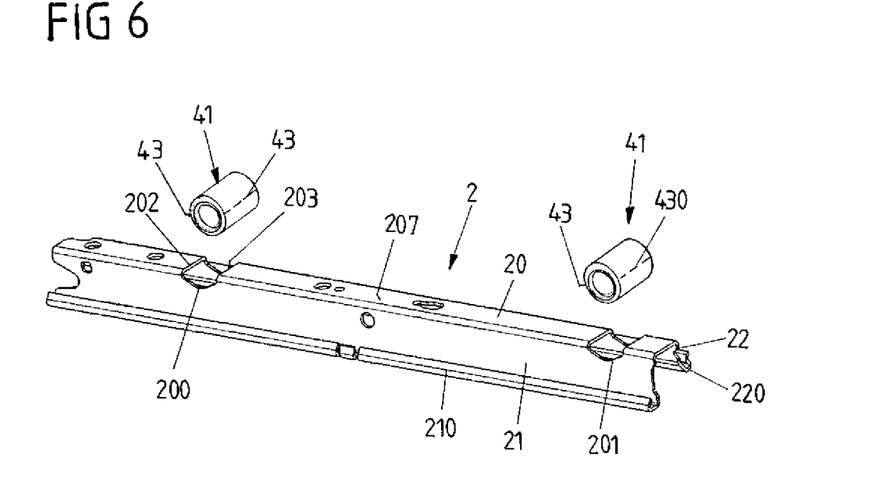
FIG. 6 shows another embodiment of an upper guide rail and fastener elements to be connected directly to the upper guide rail.

In another embodiment shown in FIG. 6 fasteners 41 may be directly welded, by means of weld joints 43 formed on both sides of the respective fastener 41, to the upper guide rail 2, without using an attachment bracket 40. The weld joints 43 are formed by weld lines in between the fastener 41 and a corresponding edge 202, 203 of the associated aperture 200, 201 formed on the top wall 20 of the upper guide rail 2, such that the fastener 41 is received in an associated aperture 200, 201 and is directly connected to the upper guide rail 2 by welding.

Figure 8:
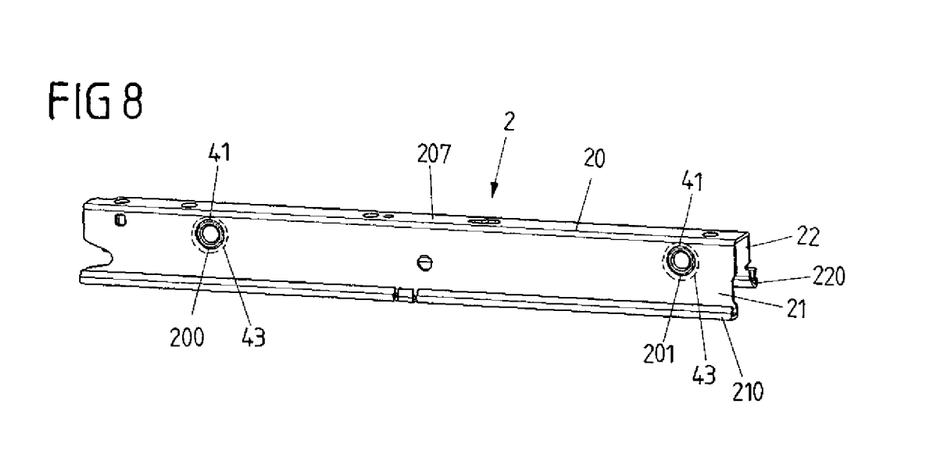
FIG. 8 shows a view of another embodiment of an upper guide rail with fastener elements connected to the upper guide rail.
Figure 9:
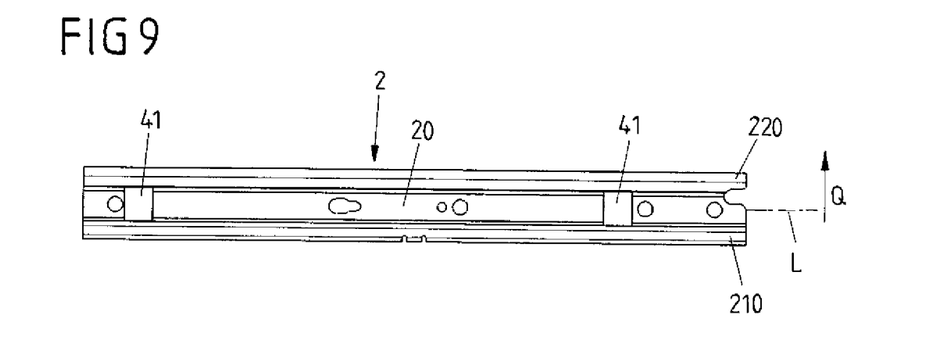
FIG. 9 shows a bottom view of the embodiment of FIG. 8.

In yet another embodiment shown in FIGS. 8 and 9, apertures 200, 201 in the shape of bores in both side walls 21, 22 are formed on the upper guide rail 2, fasteners 41 being placed within the apertures 200, 201 such that each fastener 41 is received in the bores on the side walls 21, 22 and extends from one side wall 21 to the other side wall 22. Each fastener 41 herein may be connected to the upper guide rail 2 by means of weld joints 43 having a circular shape and being formed to circumferentially extend about each bore, as visible from FIG. 8.

When comparing the upper guide rail 2 according to the embodiment of FIG. 8 for example to the upper guide rail 2 as shown in FIG. 3, it is visible that the top wall 20 is elevated in the embodiment of FIG. 8 in comparison to the embodiment of FIG. 3. This is to fully receive the fasteners 41 beneath the top wall 20, the fasteners 41 extending in between the side walls 21, 22 across an inner space of the upper guide rail 2 beneath the top wall 20.

Figure 10:
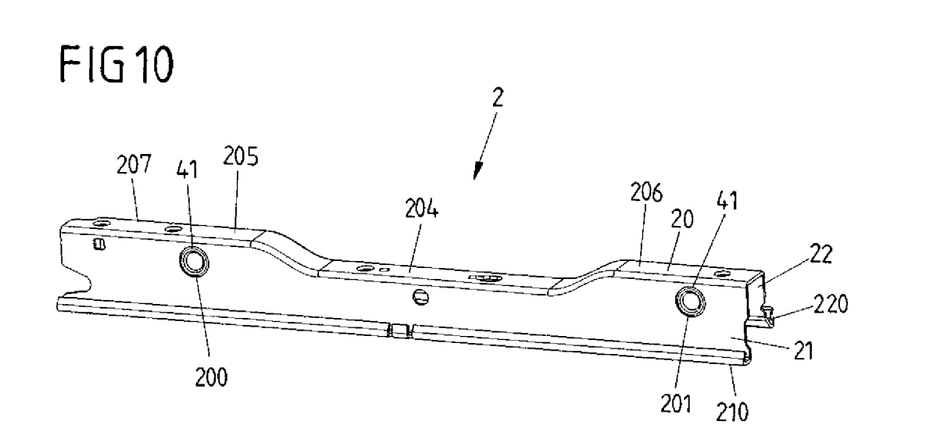
FIG. 10 shows a view of another embodiment of an upper guide rail with fastener elements connected to the upper guide rail.

In another embodiment shown in FIG. 10, the top wall 20 is only partially elevated at elevated portions 205, 206, a middle portion 204 of the top wall 20 being recessed with respect to the elevated portions 205, 206. The fastener 41 herein are received in apertures 200, 201 formed by bores in the side walls 21, 22 in the region of the elevated portion 205, 206.

When using an attachment bracket 40 to connect a fastener 41 to the upper guide rail 2, as in the embodiment of FIGS. 3 to 5, attachment brackets 40 of different shape and constitution may be used.

Figure 11:
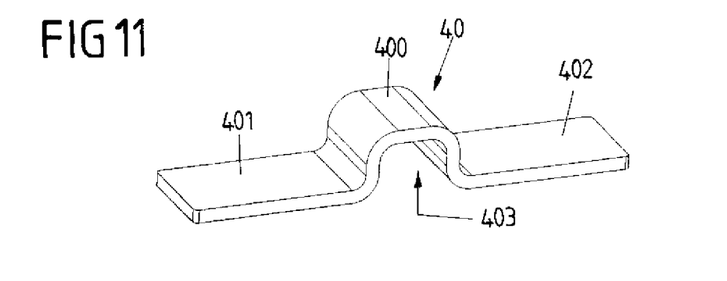
FIG. 11 shows a view of an embodiment of an attachment bracket for fixing a fastener element to an upper guide rail.
Figure 12:
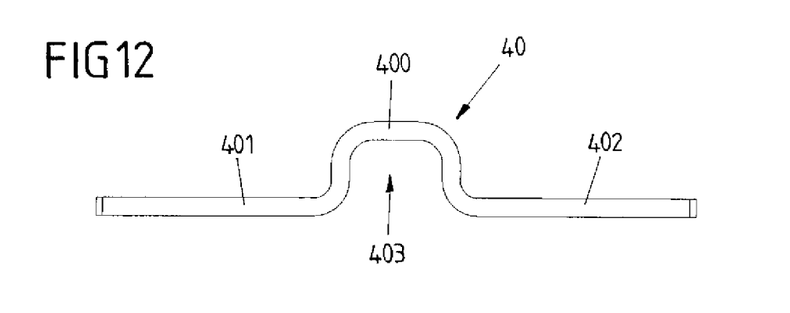
FIG. 12 shows a side view of the attachment bracket according to FIG. 11.

In one embodiment as shown in FIGS. 11 and 12, an attachment bracket 40 may have a general C-shape, flange sections 401, 402 extending laterally from a middle section 400, the flange sections 401, 402 being formed to form a lap joint with the top wall 20 of an upper guide rail 2 and being configured to establish a welding connection in between the attachment bracket 40 and the associated top wall 20. The middle section 400 forms a reception space 403 in which an associated fastener 41 may be received, as this shall be explained further below with reference to FIGS. 15 to 18.

Figure 13:
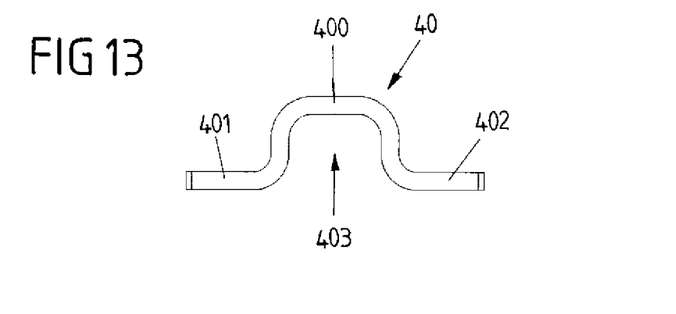
FIG. 13 shows another embodiment of an attachment bracket.
Figure 14:
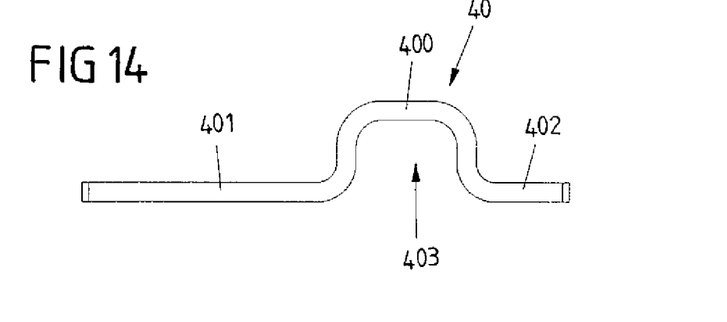
FIG. 14 shows yet another embodiment of an attachment bracket.

The flange sections 401, 402 of the attachment bracket 40 may be adapted to provide a lap joint with the top wall 20 of the associated upper guide rail 2, the lap joint being fixated by welding in order to exhibit a desired strength and being adapted to the shape of the top wall 20. In particular, the axial length of the flange sections 401, 402 (measured along the longitudinal axis L) may be adapted, as visible from FIG. 12 and FIG. 13, according to a desired overlap and a desired area to form a weld connection, wherein it also is conceivable to form the flange sections 401, 402 with different axial lengths, as this is visible in FIG. 14.

As visible from FIGS. 15 to 18, a fastener 41 may be received within the reception space 403 of the middle section 400 at different height positions, measured along a vertical direction Z perpendicular to the top face 207 of the top wall 20 of an associated upper guide rail 2. By positioning the fastener 41 at a suitable height position within the reception space 403 the pivot axis P2 of a link arm 120, 121 may be defined with respect to the upper guide rail 2 in a variable, adjustable manner, wherein after positioning the fastener 41 within the reception space 403 the fastener 41 is connected to the middle section 400 of the attachment bracket 40 by means of weld joints 43 (in the shape of weld lines extending transversely along the transverse direction Q).

Figure 15:
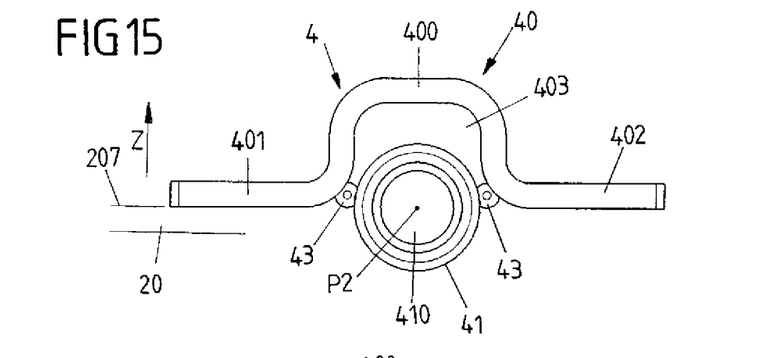
FIG. 15 shows an embodiment of an attachment bracket in connection with a fastener element, at a first height position.
Figure 16:
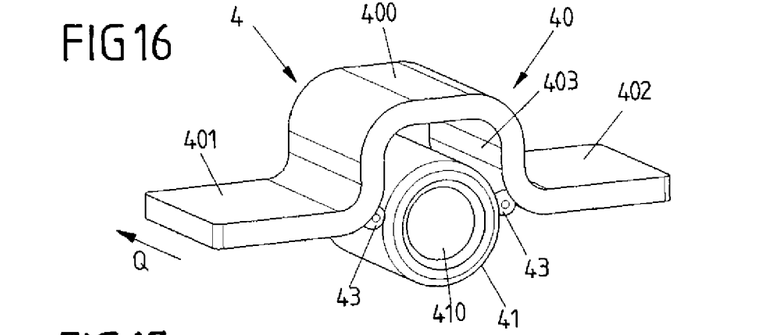
FIG. 16 shows a perspective view of the arrangement of FIG. 15.
Figure 17:
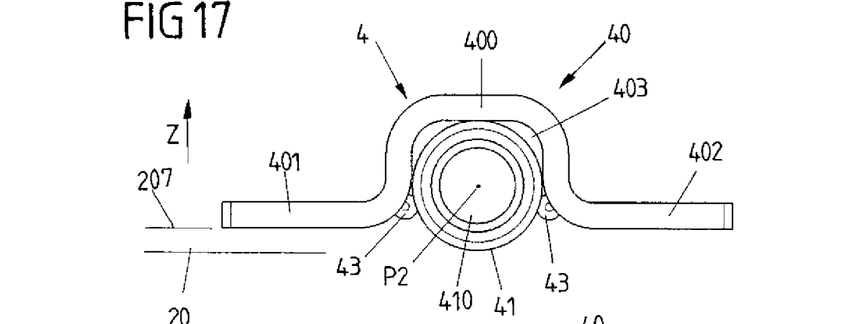
FIG. 17 shows the attachment bracket and the fastener element, at another, second height position of the fastener element with respect to the attachment bracket.
Figure 18:
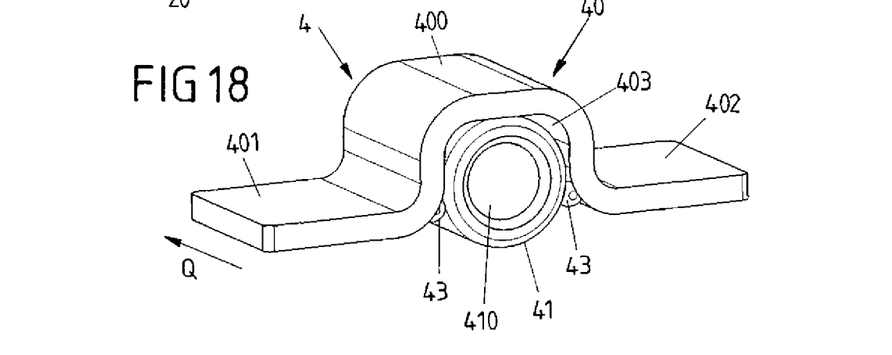
FIG. 18 shows a perspective view of the arrangement of FIG. 17.

FIGS. 15 and 16 illustrate a placement of a fastener 41 at a comparatively low height position with respect to the attachment bracket 40, whereas FIGS. 17 and 18 shows an embodiment of a fastener 41 placed within the reception space 403 at an elevated height position with respect to the attachment bracket 40.

The weld joint 43, in FIGS. 15 to 18, may in particular be formed by MIG or MAG welding.

A sub-assembly 4 as shown in FIGS. 15 to 18 may be manufactured to provide a pre-assembly group, which may then be attached to and fastened on an associated upper guide rail 2.

Other shapes of attachment brackets 40 are conceivable.

Figure 19:
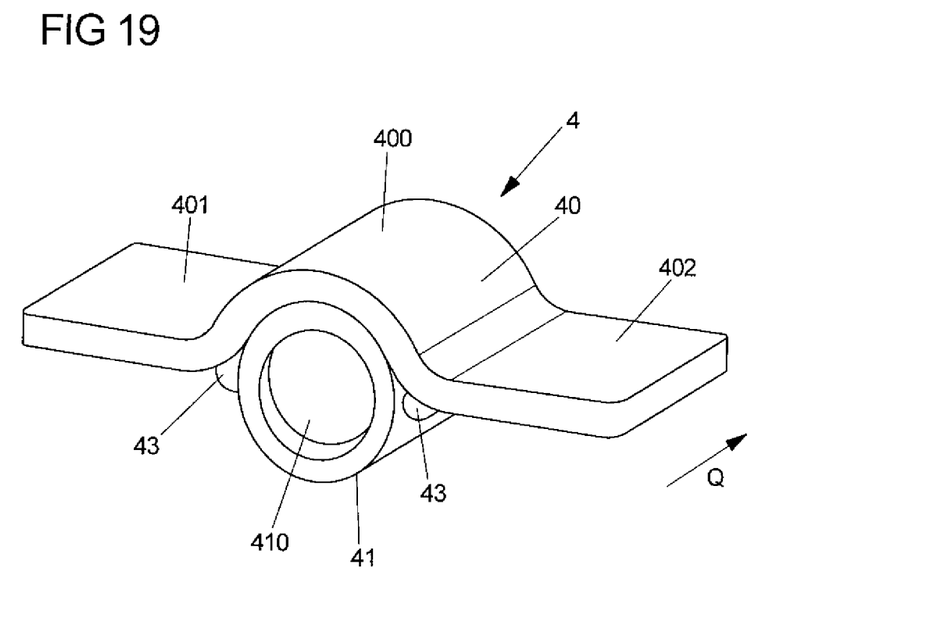
FIG. 19 shows another embodiment of an attachment bracket in connection with a fastener element.

For example, as shown in FIG. 19, the middle section 400 of an attachment bracket 40 may have a rounded shape for receiving a fastener element 41, the curvature of the middle section 400 being adapted to the curvature of the fastener 41. In this embodiment, weld joints 43 in the shape of weld lines extending transverse along the transverse direction Q may be formed in between the fastener 41 and the attachment bracket 40 to fix the fastener 41 to the attachment bracket 40.

Figure 20:
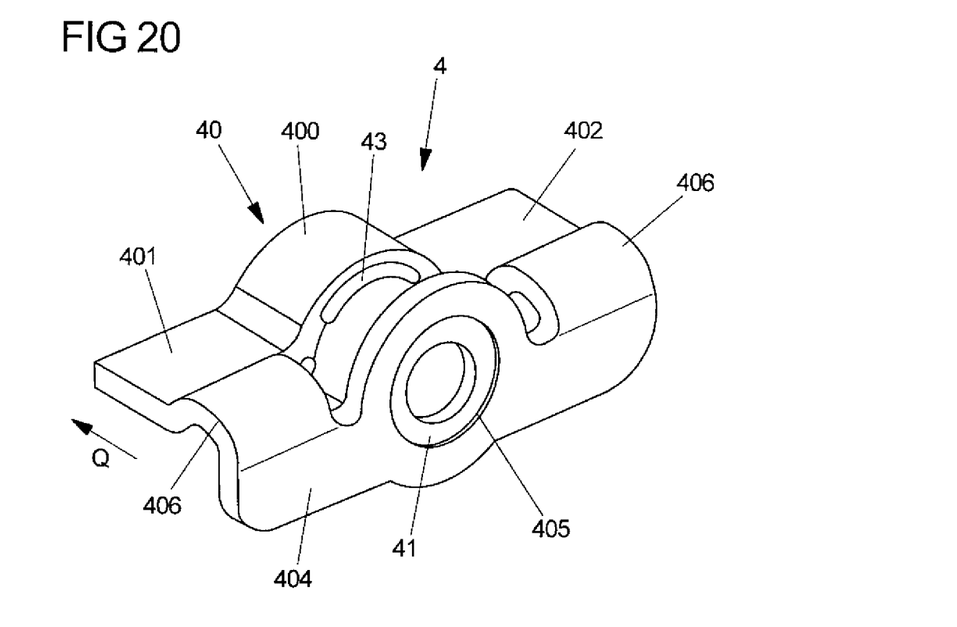
FIG. 20 shows yet another embodiment of an attachment bracket in connection with a fastener element.

In another embodiment shown in FIG. 20, a front face 404 comprising an opening 405 for receiving the fastener 41 is connected by connecting portions 406 to flange sections 401, 402 of an attachment bracket 40. In this embodiment, for example a weld joint 43 curved about the transverse direction Q may be formed to connect the fastener 41 to the middle section 400 of the attachment bracket 40.

Figure 21:
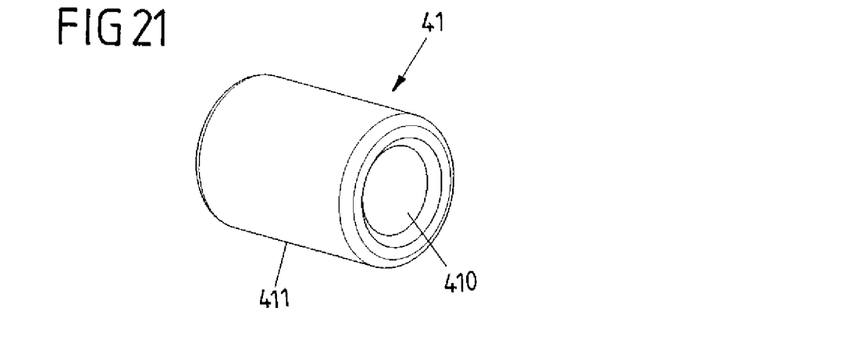
FIG. 21 shows an embodiment of a fastener element to be connected to an upper guide rail.
Figure 22:
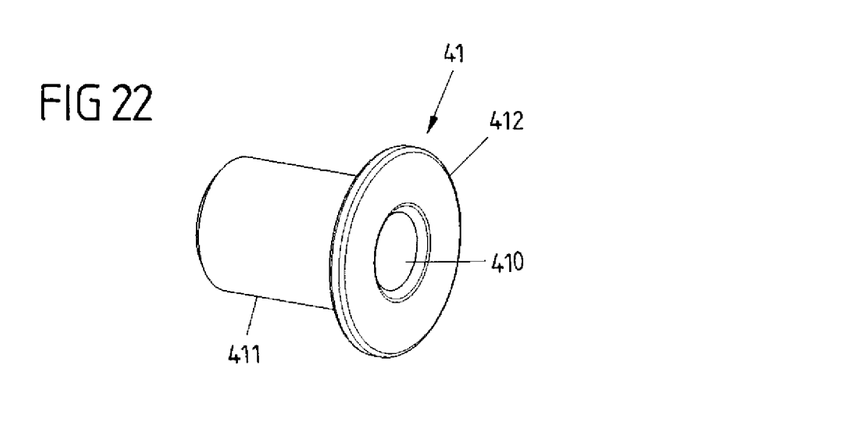
FIG. 22 shows another embodiment of a fastener element to be connected to an upper guide rail.
Figure 23:
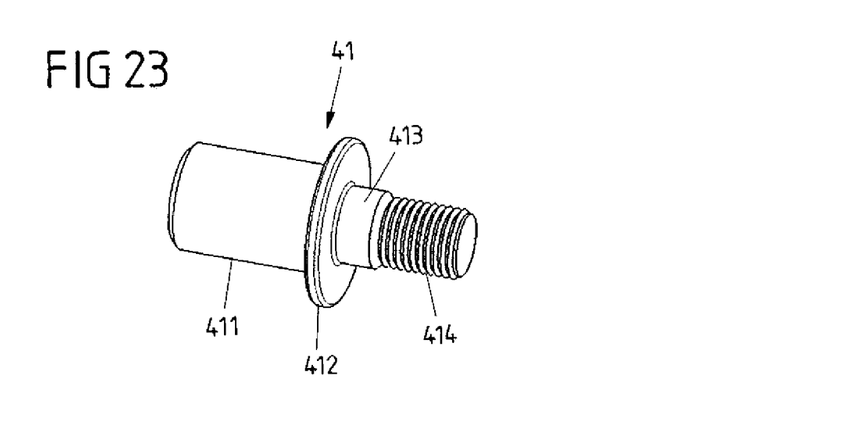
FIG. 23 shows yet another embodiment of a fastener element to be connected to an upper guide rail.

A fastener 41 to be connected to an associated upper guide rail 2 may have different forms and functions, as shown in FIGS. 21 to 23. The fastener 41 may in particular be shaped as a threaded sleeve having a body portion 411 and a threaded opening 410 formed within the body portion 411, as shown in FIGS. 21 and 22, wherein in addition a bearing face 412 may be formed on the body portion 411 to extend radially beyond the body portion 411, as shown in FIG. 22. The bearing face 412 provides an abutment face for axially abutting an associated link arm 120, 121.

Figure 24:
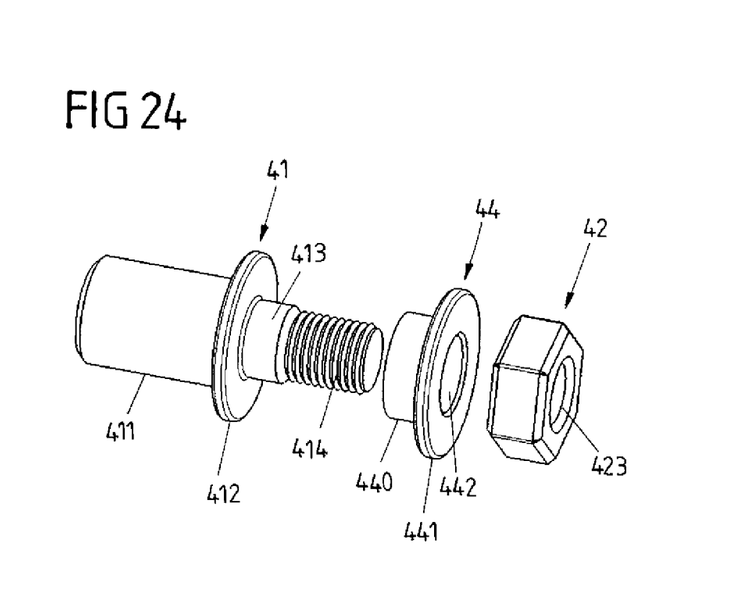
FIG. 24 shows the fastener element of FIG. 23 in association with another, second fastener element.
Figure 25:
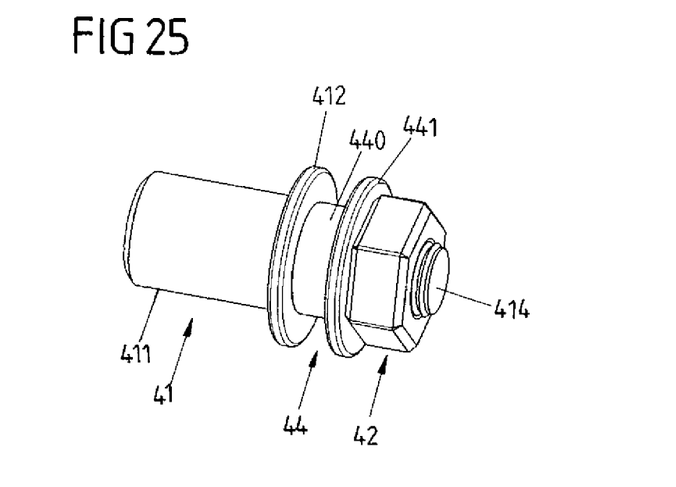
FIG. 25 shows the fastener elements of FIG. 24, in a connected state.

In another embodiment shown in FIG. 23, the fastener 41 is shaped as a threaded stud comprising a body portion 411 to be fastened to the upper guide rail 2, the fastener 41 furthermore comprising a threaded shaft 414, a cylindrical section 413 and a bearing face 412. As shown in FIGS. 24 and 25, another, second fastener 42 in the shape of a nut having a threaded opening 423 may be placed on the threaded shaft 414, wherein in addition a bearing element 44 is to be placed on the cylindrical section 413 of the fastener 41 in order to form a bearing for an associated link arm 120, 121. The bearing element 44 comprises a bearing section 440 axially confined by a bearing face 441, an opening 442 extending through the bearing element 44 such that the bearing element 44 may be placed on the cylindrical section 413 of the fastener 41, as visible in FIG. 25. By screwing the fastener 42 onto the threaded shaft 414 of the fastener 41, the bearing element 44 can axially be fixed on the fastener 41, such that a link arm 120, 121 received on the bearing section 440 is pivotably coupled to an upper guide rail 2.

The embodiments described herein are not limiting for the invention as set forth in the claims, but merely provide illustrative examples. The invention can be carried out in an entirely different manner in entirely different embodiments.

REFERENCE NUMERALS

1 Vehicle seat
10 Seat part
100 Frame assembly
11 Backrest part
12 Height adjustment mechanism
120, 121 Link arm
13 Length adjustment mechanism
14 Vehicle floor
2 Upper guide rail
20 Top wall
200, 201 Aperture
202, 203 Edge
204 Middle portion
205, 206 Elevated portion
207 Top surface
21, 22 Side walls
210, 220 Lower edge
3 Lower guide rail
4 Sub-assembly
40 Attachment bracket
400 Middle section
401, 402 Flange section
403 Reception space
404 Front face
405 Opening
406 Connecting portion
407 Projection
41 First fastener
410 Threaded opening
411 Body portion
412 Bearing face
413 Cylindrical section
414 Threaded shaft
42 Second fastener
420 Threaded shaft
421 Bearing section
422 Head section
423 Threaded opening
43 Weld joint
44 Bearing element
440 Bearing section
441 Bearing face
442 Opening
L Longitudinal axis
P1-P4 Pivot axis
Q Transverse direction
Z Vertical direction

The invention claimed is:

1. An assembly group of a vehicle seat, the assembly group comprising:
a lower guide rail attachable to a vehicle floor;
an upper guide rail coupled to the lower guide rail and movable with respect to the lower guide rail along a longitudinal axis, the upper guide rail comprising a top wall and a pair of side walls connected by the top wall;
a link arm pivotably connectable to the upper guide rail for coupling a frame assembly to the upper guide rail; and
a first fastener for pivotably coupling the link arm to the upper guide rail, the first fastener being disposed between the pair of side walls and being at least partially positioned below a top surface of the top wall, wherein the upper guide rail comprises an aperture for receiving the first fastener, wherein the aperture is formed in the top wall and in both side walls of the pair of side walls.

2. The assembly group according to claim 1, further comprising a second fastener connectable to the first fastener for pivotably coupling the link arm to the upper guide rail.

3. The assembly group according to claim 2, wherein one of the first fastener and the second fastener comprises a threaded opening and the other of the first fastener and the second fastener comprises a threaded shaft to be screwed into said threaded opening for connecting the first fastener and the second fastener to each other.

4. An assembly group of a vehicle seat, the assembly group comprising:
a lower guide rail attachable to a vehicle floor;

an upper guide rail coupled to the lower guide rail and movable with respect to the lower guide rail along a longitudinal axis, the upper guide rail comprising a top wall and a pair of side walls connected by the top wall;

a link arm pivotably connectable to the upper guide rail for coupling a frame assembly to the upper guide rail; and a first fastener for pivotably coupling the link arm to the upper guide rail, the first fastener being disposed between the pair of side walls and being at least partially positioned below a top surface of the top wall, wherein the upper guide rail comprises an aperture for receiving the first fastener, and wherein each side wall of the pair of side walls comprises a bore, the bores of the side walls together forming said aperture for receiving the first fastener.

5. The assembly group according to claim 1, wherein the first fastener extends, along a direction transverse to the longitudinal axis, from a first side wall of the pair of side walls to a second side wall of the pair of side walls.

6. The assembly group according to claim 1, wherein the first fastener is connected to the upper guide rail by means of a weld joint.

7. An assembly group of a vehicle seat, the assembly group comprising:
 a lower guide rail attachable to a vehicle floor;
 an upper guide rail coupled to the lower guide rail and movable with respect to the lower guide rail along a longitudinal axis, the upper guide rail comprising a top wall and a pair of side walls connected by the top wall;
 a link arm pivotably connectable to the upper guide rail for coupling a frame assembly to the upper guide rail;
 a first fastener for pivotably coupling the link arm to the upper guide rail, the first fastener being disposed between the pair of side walls and being at least partially positioned below a top surface of the top wall; and
 an attachment bracket connected to the top wall of the upper guide rail, wherein the first fastener is connected to the attachment bracket by a weld joint.

8. The assembly group according to claim 7, wherein the attachment bracket bridges, along the longitudinal axis, an aperture formed in the top wall for receiving the first fastener.

9. The assembly group according to claim 7, wherein the attachment bracket comprises a middle section and at least one flange section, wherein the middle section confines a reception opening for receiving the first fastener and the at least one flange section is flatly placed on the top wall of the upper guide rail.

10. The assembly group according to claim 9, wherein the at least one flange section is connected to the top wall of the upper guide rail by welding.

11. The assembly group according to claim 9, wherein the first fastener is connected to the middle portion by at least one weld joint.

12. The assembly group according to claim 9, wherein, in a pre-assembly state in which the first fastener is separate from the attachment bracket, the first fastener is receivable within the reception opening confined by the middle portion at different height positions when viewed along a vertical direction perpendicular to the top wall of the upper guide rail.

* * * * *